Aug. 7, 1962     S. A. McGAVERN     3,048,649
CABLE MOTION DAMPER
Filed June 8, 1959
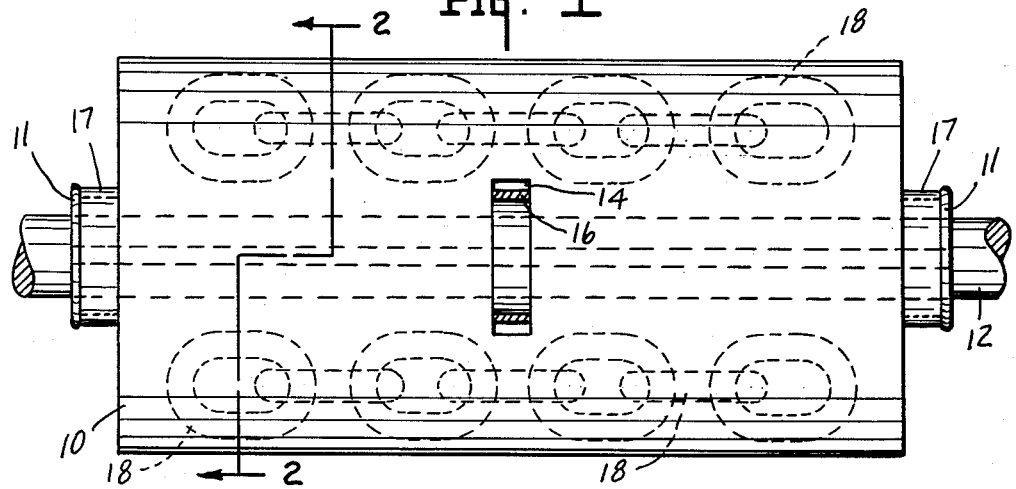
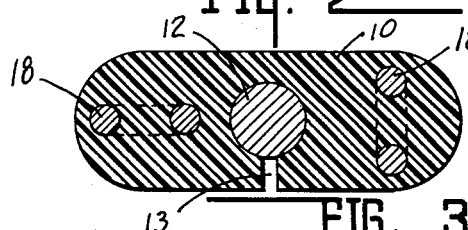
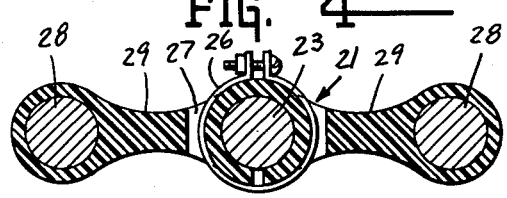
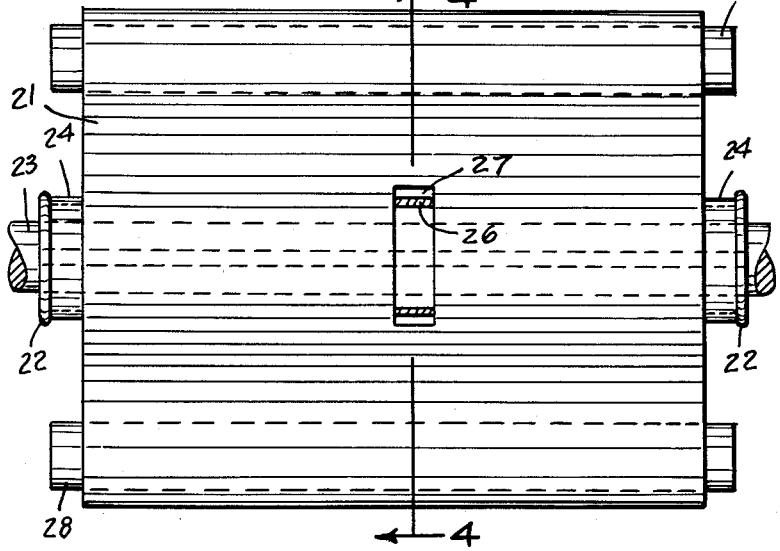
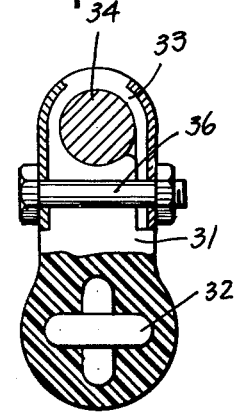
INVENTOR.
SANFORD A. McGAVERN.
BY
Lockwood, Wooday, Smith & Weikart
ATTORNEYS.

United States Patent Office 3,048,649
Patented Aug. 7, 1962

3,048,649
CABLE MOTION DAMPER
Sanford A. McGavern, Indianapolis, Ind., assignor to Schwitzer Corporation, Indianapolis, Ind., a corporation
Filed June 8, 1959, Ser. No. 818,751
2 Claims. (Cl. 174—42)

This invention relates generally to motion or vibration dampers for cable, wire or the like and in particular to a wave smothering type damper for use on electrical transmission line cables.

Transmission lines or cables are conventionally suspended from spaced towers. The portion of the cable between supporting towers hangs in a catenary curve and is subject to undesirable motion caused by wind, sleet and the like. This motion or dancing of the transmission line is generally of two types.

One of the types of wind induced motion may be termed cable vibration. This condition exists when the cable is subjected to steady winds, and the vibrations vary with wind speed, cable weight and cable tension. Average vibration frequency ranges between ten to one hundred cycles per second, and distances between node points will vary from one and one-half to twenty-five feet.

The other type of undesirable cable motion occurs when the cable is subjected to sleet with a light, steady wind. The freezing of the sleet on the normally round section changes it to an aero-dynamic unstable profile. When this new shape is exposed to wind both standing waves and traveling waves of motion may result. Such motion may be in either vertical or circular paths. As a result of this cable motion, heavy lines running parallel and spaced some thirty feet apart have been known to engage each other under maximum wind and sleet conditions. Heretofore the only solution to the problem has been to materially decrease tower spacing or use larger towers with increased line spacing, remedies which obviously involve considerable expense.

The cable motion induced by either of the conditions referred to above, if unchecked and permitted to reach the cable support points, causes the cable to flex back and forth through a zero position at the support point thereby inducing fatigue in the cable metal. The more frequent use of aluminum cables has increased the need for minimizing this flexing. If the vibrations are permitted to enter the support points they will be transmitted to the supporting structure such as a tower and may fatigue the tower, generate tower element resonances, and shake loose nuts, bolts, rivets and the like. Aside from the effects just mentioned, if the vibrations are unchecked their amplitude may increase or build up should conditions of resonance occur.

The present invention provides a damper element which is adapted for installation on a line such as an electrical power transmission cable and which extends over a length of the cable as distinguished from being supported thereon at a single point. Thus, as motion is generated near the center of a cable span and approaches the supported ends of the cable as a wave, it will enter the damper and will be subjected to a damping or smothering action. The energy of the wave will be substantially dissipated before it can emerge from the opposite end of the damper and will be converted into thermal energy in the damper media. In the cases of large movement air damping may also be achieved because of the shape of the damper.

It is the primary object of the present invention, therefore, to provide a means to smother or dampen vibrations and other externally excited cyclical motions which extend or traverse along the length of supported wires or cables.

It is a further object of the present invention to provide a cable vibration damper assembly utilizing a mass carried parallel to the cable by a material having inherent damping qualities, such as rubber, and effective to damp waves of various length and frequency.

It is a further object of the present invention to provide a device constructed in such a way that attachment may be made without cutting into the cable or wire at the clamp point, it being recognized that such a cut would act as a stress riser.

The full nature of the invention will be understood from the accompanying drawings and the following description and claims:

FIG. 1 is a top plan view of a damper assembly embodying the present invention.
FIG. 2 is a section view taken generally along the line 2—2 of FIG. 1.
FIG. 3 is a top plan view of a modified form of the present invention.
FIG. 4 is a sectional view taken generally along the line 4—4 of FIG. 3.
FIG. 5 is an end view of a further modified form of the present invention.

Referring initially to FIGS. 1 and 2, the damper assembly includes a generally rectangular sheath 10 formed of a material which has inherent vibration damping characteristics such as rubber. Concentric with its major center line, the sheath has outwardly extending bosses 11, the bosses and the sheath proper being provided with aligned apertures concentric with the major center line of the sheath and adapted to accommodate a power transmission cable 12 of solid or stranded construction. The sheath 10 may be formed so that the cable accommodating aperture is not completely closed, as indicated at 13 in FIG. 2, whereby the sheath may be snapped over the cable rather than threaded thereon.

The central portion of the sheath may be provided with spaced apertures 14 which accommodate a conventional hose clamp 16. The bosses 11 are also adapted to accommodate conventional hose clamps 17, the claims permitting tightening of the sheath on the cable.

Adjacent each of its side margins the sheath carries elongated flexible weights which may take the form of the link chains 18. The chains may be molded into the sheath as indicated in FIG. 2.

In operation, with the damper assembly installed upon a cable supported at spaced points, the positioning of the weights outwardly from the axis of the cable and the flexibility of the sheath convert substantially all of the kinetic energy of vibratory motion of the cable into thermal energy within the sheath. The extension of the sheath over an appreciable length of the cable tends to break down and absorb any wave motion proceeding along the cable. Air damping is also achieved since the damper lies primarily in a horizontal plane whereas the cable motion is primarily vertical.

Referring now to FIGS. 3 and 4, a modified form of the damper assembly includes a sheath 21 which may be molded of rubber and provided with bosses 22. A cable 23, such as a power transmission cable, is accommodated in aligned apertures in the bosses and the sheath proper, the sheath being fixed to the cable by means of conventional hose clamps 24, which encircle the bosses 22 and central hose clamps 26 which extend through apertures 27 formed in the central portion of the sheath. Along its major outer margins the sheath carries elongated weights which may take the form of steel bars 28, the axis of the bars being parallel to the axis of the accommodated cable.

As may best be seen in FIG. 4, the sheath is molded so as to provide longitudinal side sections 29 which have a reduced cross sectional thickness. The reduced thickness of the sections 29 provides added flexibility of the bars 28 in a plane transverse to the axis of the cable.

The operation of this form of the invention is identical to that of the form described with reference to FIGS. 1 and 2. That is, after the damper assembly has been fixed on the cable, wave motions of various frequencies will be converted to thermal energy by the flexing of the sheath caused by the inertia effect of the suspended weights 28.

Referring to FIG. 5, a further modified form of the invention will now be described. In this form of the invention the sheath 31 may be molded of a flexible, resilient material such as rubber and supports only a single elongated weight which may take the form of the link chain 32. The sheath may be molded with spaced flaps 33 of reduced cross section which may be positioned as shown in FIG. 5 to encircle a line or cable 34. Through bolts 36 may be utilized to retain the flap 33 and thus clamp the sheath to the cable.

The simplified assembly of FIG. 5 is adapted for use with relatively light lines or cables such as telephone lines. Its operation is generally the same as that of the previously described form of the invention. The suspended weight and the sheath which extend along an appreciable length of the cable cooperate to absorb the kinetic energy of wave motions traversing the cable 34.

While the invention has been disclosed and described in some detail in the drawings and foregoing description, they are to be considered as illustrative and not restricted in character, as other modifications may readily suggest themselves to persons skilled in the art and within the the broad scope of the invention, reference being had to the appended claims.

The invention claimed is:

1. An assembly for damping vibration in a cable or the like supported at spaced points, said assembly including a generally rectangular sheath formed of a flexible, resilient material such as rubber, said sheath being relatively short in length as compared to distance between the cable support points and having a width dimension appreciably greater than its thickness, means for clamping said sheath on the cable with its longitudinal axis parallel to the cable axis, two elongated weights each solely supported by said sheath adjacent respective major side margins of said sheath, said weights being disposed on opposite sides of a vertical plane through the longitudinal axis of said sheath, said weights being thereby parallel to the cable axis and spaced therefrom, said weights and said sheath serving to transform vibratory wave motion traversing said cable into thermal energy by the flexing of said sheath.

2. An assembly for damping vibration in a cable or the like supported at spaced points, said assembly including an elongated sheath formed of a flexible, resilient material such as rubber, said sheath being relatively short in length as compared to the distance between the cable support points and having a width dimension appreciably greater than its thickness, means for clamping said sheath on the cable with its longitudinal axis parallel to the cable axis, two elongated weights each solely supported by said sheath adjacent respective major side margins of said sheath, said weights being disposed on opposite sides of a vertical plane through the longitudinal axis of said sheath, said weights being thereby parallel to the cable axis and spaced therefrom, said weights and said sheath serving to transform vibratory wave motion traversing said cable into thermal energy by the flexing of said sheath.

References Cited in the file of this patent

UNITED STATES PATENTS

| | | |
|---|---|---|
| 416,122 | Park | Nov. 26, 1889 |
| 1,671,659 | Varney | May 29, 1928 |
| 1,773,659 | Austin | Aug. 19, 1930 |
| 2,144,872 | Cruser | Jan. 24, 1939 |
| 2,694,101 | Shuhart | Nov. 9, 1954 |
| 2,950,338 | Taylor | Aug. 23, 1960 |

FOREIGN PATENTS

| | | |
|---|---|---|
| 331,220 | Italy | Oct. 31, 1935 |
| 747,691 | Great Britain | Apr. 11, 1956 |